Nov. 6, 1928.  
E. A. SCHUMACHER ET AL  
1,690,252  
CULTIVATOR  
Filed Oct. 11, 1923　　3 Sheets-Sheet 1
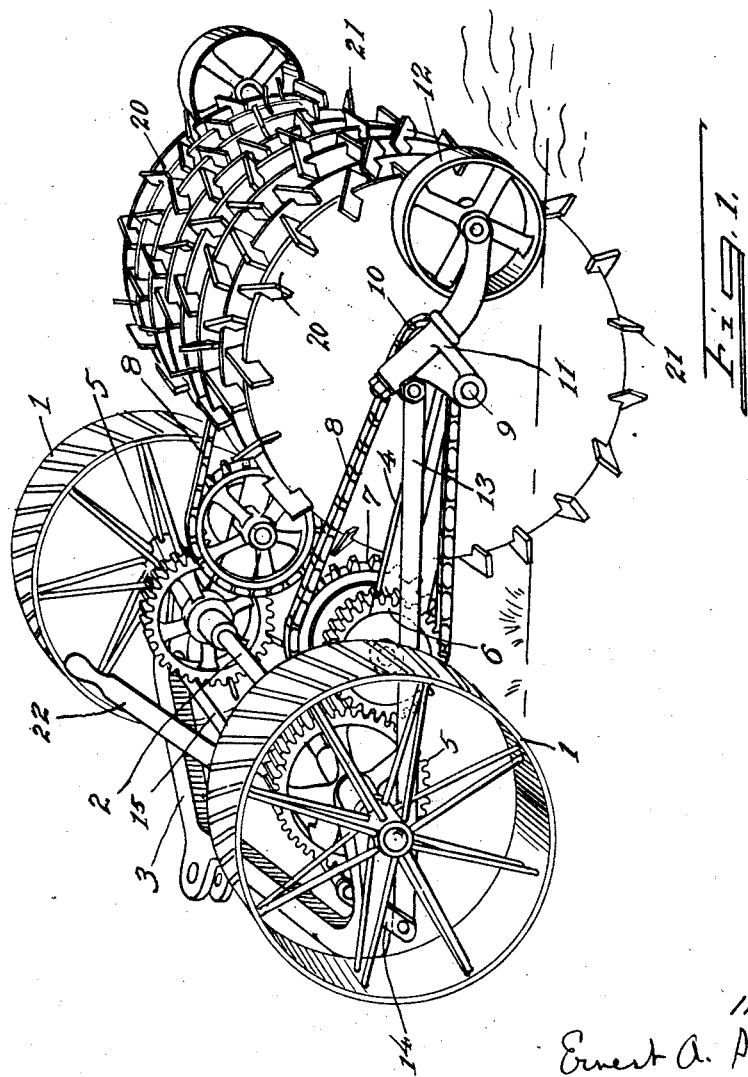
INVENTORS  
Ernest A. Schumacher  
Harry E. Wessling  
BY  
ATTORNEYS.

Nov. 6, 1928.
E. A. SCHUMACHER ET AL
1,690,252
CULTIVATOR
Filed Oct. 11, 1923
3 Sheets-Sheet 2
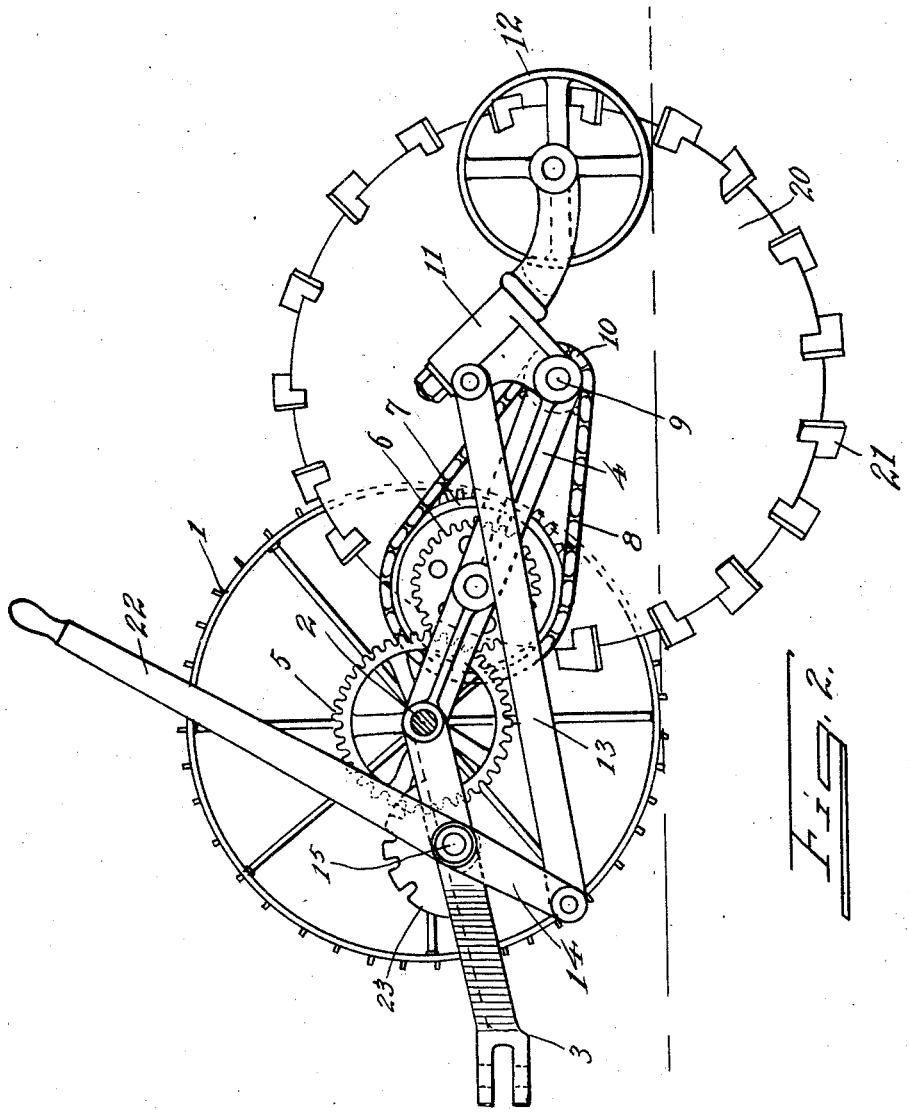
INVENTORS
Ernest A. Schumacher
Harry E. Wessling
BY
ATTORNEYS.

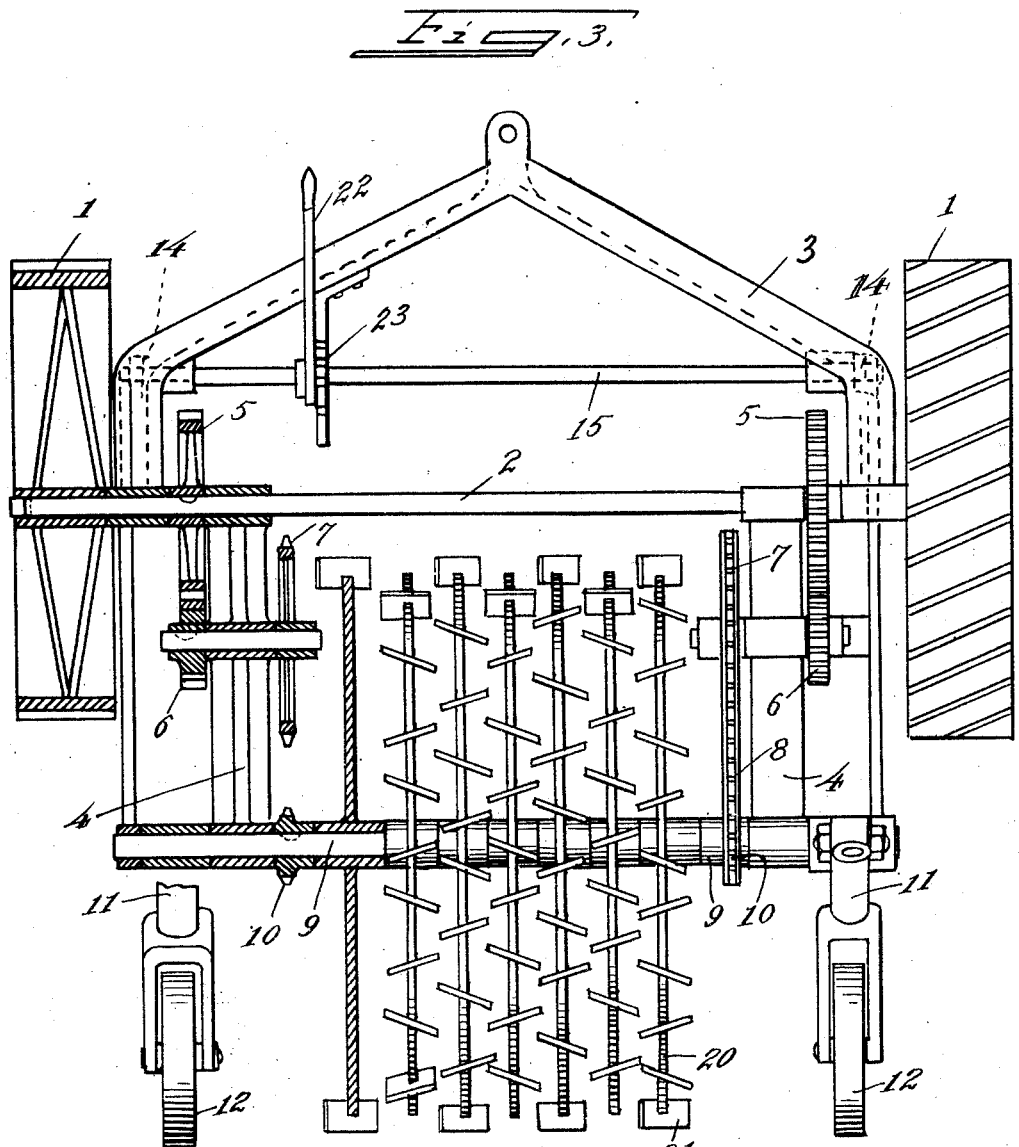

Patented Nov. 6, 1928.

1,690,252

UNITED STATES PATENT OFFICE.

ERNEST A. SCHUMACHER AND HARRY E. WESSLING, OF CINCINNATI, OHIO.

CULTIVATOR.

Application filed October 11, 1923. Serial No. 668,009.

Our invention relates to land cultivating devices in which a rotary element is employed to accomplish the joint results of a gang plow, and a disk harrow, at one and the same time. In its simpler embodiment our device is built as a tractor drawn element.

We are aware that it has been proposed by various persons to cultivate the earth by a rotary drum device or chain drum device having blades therein to stir up the ground, and pulverize it at the same time, but so far as we are advised these devices have not gone into use either through inoperativeness or the excessive expense attendant upon their construction and locomotion.

It is our object to provide a device in which the parts are simple of construction, and well adapted to self clearing of clods of earth dislodged. It is our object to use instead of a drum, a series of thin disks which themselves have the action of cutting up the earth that is dislodged by the digging blades.

Counter to what we understand has been the scheme of the proposed devices above referred to, it is our object to provide a rotary blade structure which revolves in the opposite direction to the movement of the tractor element and carrying wheels.

It is our object in our arrangement to maintain a deflecting position of all blades so that they enter the ground and leave it with one corner first, thereby making the digging operation easier. It is also our object to stagger the various blade positions so as to avoid the chance of earth falling from one set of blades, becoming imprisoned and acting to clog another set.

Essentially it is our object to maintain an open space beneath all blades, as distinguished from a drum, or a set of chain carrying drums, thereby facilitating the self-freeing action of the device, from adhering clods of earth or sod.

Among other things we also wish to note that by the counter direction of revolution between the carrying wheels and the digging element, we insure the device against the digging element riding on the top of the ground, and provide for a successive action of a series of blades upon the dislodged earth, rather than requiring each blade to enter into the virgin soil. In other words, the blades of our device do not encounter the untreated ground until they are about to move upwardly, instead of as they move downwardly into the ground.

The above objects and other advantages to be noted, we accomplish by that certain construction and arrangement of parts to be hereinafter more specifically pointed out and claimed.

In the drawings:

Figure 1 is a perspective view of the complete device.

Figure 2 is a side elevation showing the drive, and the earth digging elements.

Figure 3 is a top plan view of the complete device.

The structure shown in the drawings is merely a pictorial illustration of the type of mechanism involved and the exact proportions of parts have been arranged for convenience of illustration rather than to show the exact proportions for the machine, since this will depend upon the size desired, and the depth of cultivation, and to some extent on the nature of the soil involved.

Essentially the machine comprises a pair of carrying wheels 1, 1; on an axle 2, which axle is journaled in a frame 3, said frame including a draw yoke to be secured to any desired tractor machine or vehicle.

On the axle and revolving therewith are a pair of gears 5, 5, which drive the digging devices, these gears meshing with gears 6, 6, carried on the frame 4, which is also journaled on the axle 2, whence these gears 6, 6, move in a planetary manner, about the gears 5, 5. The spindles of the gears 6, 6, carry chain sprockets 7, 7, said sprockets having chains 8, 8, thereon.

In the rear of the frame portion 4 is a shaft 9, which carries two sprockets 10, 10, the chains 8 driving these two sprockets, and hence driving the shaft 9.

On the two ends of the shaft 9 are journaled brackets 11, which support small carrying wheels 12, 12. The brackets are connected by rods 13, with cranks 14 on a forward shaft 15, held in the draw yoke frame portion 3. By rocking the shaft 15, the cranks exert a pull on the connecting rods, and thereby rock the brackets 11, and thrust the wheels 12 down toward the ground so as to lift away the digging devices (to be described) and permit the machine to be drawn along a roadway or field without digging into it.

The portion of the mechanism so far described can be modified as desired, it being essential that a frame be swung with relation to the carrying wheels, in which is a driven shaft, this shaft revolving in the opposite direction to the carrying wheels.

The digging devices form the essential novelty of our invention, so far as this application is concerned.

These devices are formed by a series of relatively thin disks of metal 20, arranged along the shaft 9, preferably closely interspaced from each other. These disks are shown as plain disks in the drawings, although they might be dished or canted and might have open work therein, if desired, which will be evident without illustration.

In the peripheries of the disks are sets of inserted digging blades 21. These blades are preferably set at a slant to both the horizontal and the vertical plane of the shaft 9, in the form of device illustrated, and are staggered in alternate disks, so that when a set of the disks are arranged on the shaft, no two blades will be along side of each other, and so that the corners of the blades will enter the ground first, during the digging operation instead of the whole width of the blade entering the ground. Also the blades are arranged so that they tend to throw the earth to one side or the other of the line of pull of the machine in alternate disks.

Since the shaft 9 revolves in the opposite direction to the carrying wheels, the operation of the machine will be that after being started up, the cuts into virgin earth by the blades on the disks will take place on the upward motion of said blades and not the downward motion, and any earth dislodged by the cutting action will be acted on by the blades as they move on the downward half of their underground level movement.

This action will tend to pull the digging device down into the earth and avoid the tendency for it to rise over the particularly hard points in a field. Also the action will tend to cut up in very fine condition the earth that is dislodged, and it will also tend to move to the surface the underneath earth, and then chop it up with the surface earth. The counteracting effect of the blades will tend to thoroughly agitate the earth dislodged, and since the blades are staggered and considerably wider than the disks are thick, there will be plenty of space between the disks for earth picked up by the blades to fall back between the disks, as the machine is in operation.

The disks themselves have the action of slicing up the earth that is picked up by the blades, somewhat as the disks of a land roller or disk harrow operate, again assuring fineness of the cultivated earth and freedom from clogging of the machine.

The absence of any drum, or belt, which would prevent free falling of the earth is of great value in our machine, in addition to the cultivating action of the blade carrying disks themselves.

The depth of cut of the machine can be controlled by positioning the rear carrying wheels. This is done by means of a lever 22, on the shaft 15, which operates the mechanism for raising and lowering the said wheels, and this lever is held in adjusted position by a notched segment 23, engaging the usual dog device, (not shown) by means of which such levers are held in various positions.

Thus it will be evident that the various elements of our digging mechanism, particularly in view of the reverse system of rotation of the digging element, will act upon the earth in a very efficient manner, accomplishing the work of the plow, harrow and land roller, all in one.

Having thus described our invention, what we claim as new and desire to secure by Letters Patent, is:—

In a rotary soil treating tool, a shaft, discs mounted thereon, said discs having interspaced spading blades arranged in alternate angular position with relation to the axes of said discs, said blades extending from the outer peripheries of said discs for the purposes described.

HARRY E. WESSLING.
ERNEST A. SCHUMACHER.